INVENTOR
PETER ISTVAN BONYHARD
BY Hane and Nydick
ATTORNEYS

THIN FILM MAGNETIC MEMORY MATRIX

Filed Sept. 17, 1962 2 Sheets-Sheet 2

INVENTOR
PETER ISTVAN BONYHARD
BY Hane and Nydick
ATTORNEY 3,275,998
Patented Sept. 27, 1966

3,275,998

THIN FILM MAGNETIC MEMORY MATRIX

Peter Istvan Bonyhard, St. Albans, England, assignor to International Computers and Tabulators Limited Filed Sept. 17, 1962, Ser. No. 223,928
Claims priority, application Great Britain, Sept. 22, 1961, 34,010/61
8 Claims. (Cl. 340—174)

This invention relates to magnetic devices including an area of ferromagnetic film having single domain characteristics which is switched from one stable state to an opposite stable state by the application of a suitable magnetic field.

In conventional devices employing toroidal magnetic cores, the cores are switched from one static state to the opposite static state of magnetisation by the application of a current to a drive conductor linked with the core. These cores ideally operate in truly digital manner in that they only have two static states of magnetisation. With such ideal cores any value of current below a certain threshold does not appreciably change the magnetic state of the core and consequently no output voltage is induced in a sense conductor linked with the core whereas values of current above the threshold switch the core and thereby produce an output in the sense conductor. Practical cores although having characteristics which are only approximately like the ideal do not produce any appreciable output voltage when currents of less than the threshold value are applied to the drive conductor. For example, in so-called "half-current" selection in a core matrix, energisation of one out of two drive conductors of a core by a "half current" does not generate any appreciable output voltage, an output being obtained if both drive conductors are energised.

However, in devices employing thin magnetic films having mutually perpendicular hard and easy directions of magnetisation and which switch by domain rotation, application of any value of magnetic field at an angle to the easy direction tends to align the magnetisation vector of the film with the field, the vector rotating through an angle dependent on the magnitude of the applied field. An output voltage is induced in a sense conductor linked with the film due to rotation of the magnetisation vector and in consequence an output is produced whenever any appreciable value of field is applied and again as the field decays.

In matrices of storage elements operated by "half current" selection it is necessary that an output signal is obtained only from a selected element energised by two "half currents." Similarly in devices which perform logical operations on items of data by "half current" operation, an output is required only for specified input conditions. Previously it has not been possible to utilise ferromagnetic thin film matrices and logical devices which operate by half current selection because unwanted outputs were produced by elements energised by a single half current.

It is an object of the present invention to provide ferromagnetic film devices in which unwanted output signals are concelled and do not appear in the output of the devices.

According to the invention a magnetic device includes first and second like areas of ferromagnetic film with single domain characteristics and mutually perpendicular hard and easy axis of magnetisation; means to apply a magnetic field to set the areas to one or other of two stable magnetic states; a sense conductor coupled to both areas and responsive to rotation of the magnetization vectors of said areas; first and second driving means for said first and second areas respectively, the first driving means being energised and subsequently deenergised in coincidence with energisation of said second driving means to produce coincident rotation of the magnetic vectors of both said areas such that signals induced in the sense conductor by the coincident rotation of the magnetic vectors add or subtract in accordance with the state of the areas to produce a unique output signal condition if the first area is switched from a predetermined one to the other of said stable states.

According to another aspect of the invention, a magnetic storage matrix includes a plurality of groups of storage elements, each storage device comprising a first and a second like area of ferromagnetic film with single domain characteristics and mutually perpendicular hard and easy directions of magnetisation; means to apply a magnetic field to set the devices to one or other of two stable magnetic states; a separate sense conductor coupled to both areas of the storage elements of each group respectively; first and second sets of first drive conductors and corresponding first and second sets of second drive conductors, each first area being coupled to one first drive conductor of each set and each second area being coupled to the corresponding second drive conductor of each set, no two areas being coupled to the same two conductors of first and second sets; first and second means operable to energise a selected first drive conductor of the first and second sets respectively and operable subsequently to de-energise these first conductors and coincidently to energise the corresponding second conductor to produce coincident rotation of the magnetic vectors of areas coupled to energised drive conductors and thereby induce signals in the sense conductors such that only such signals induced by a device having areas coupled to energised conductors of both said first and second sets and which were set to a predetermined one of said stable states combined to produce a unique output signal condition.

The invention will now be described by way of example with reference to the accompanying drawings in which—

Figures 1, 5:
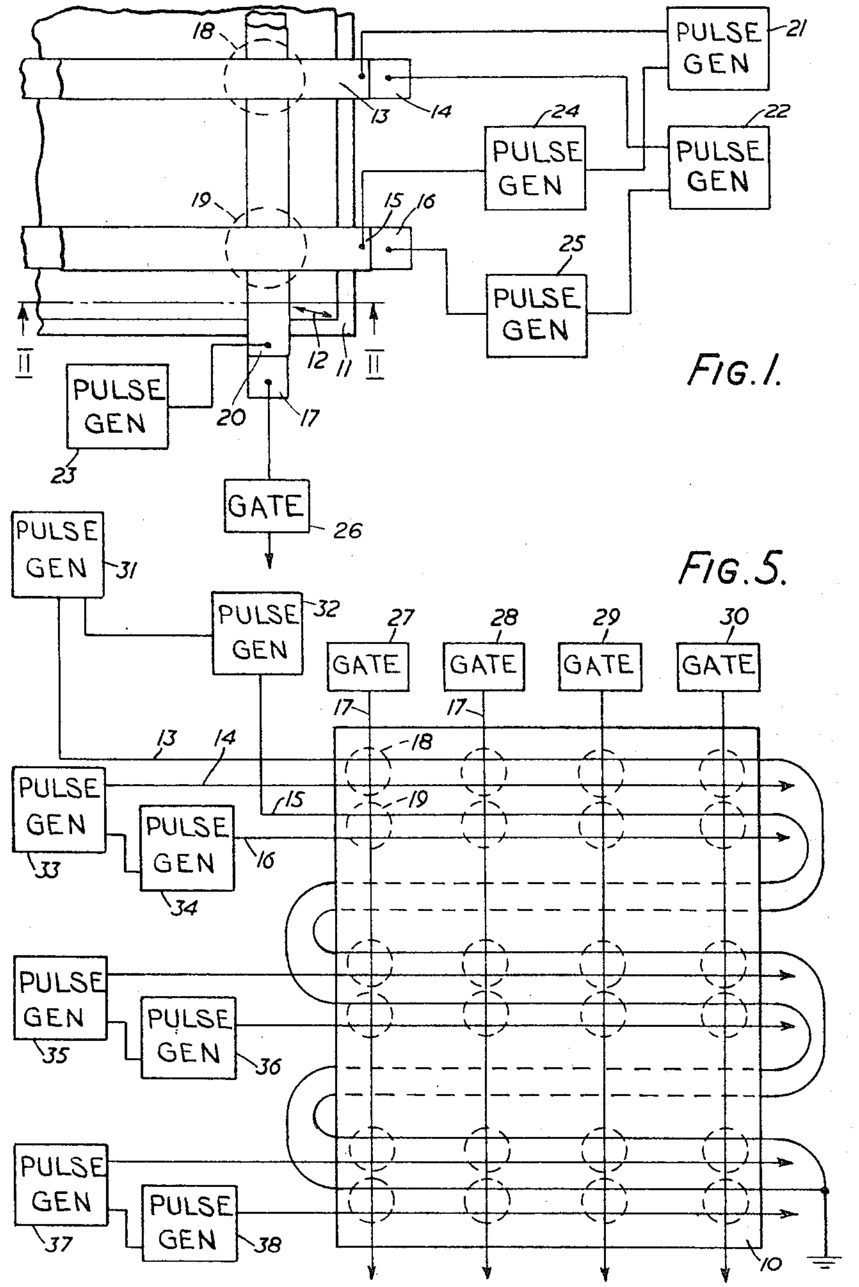
FIGURE 1 shows, in plan view, a magnetic device according to the invention.
FIGURE 5 shows one plate of a stack forming a storage matrix.
Figure 2:
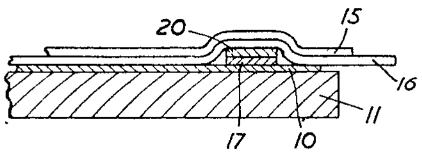
FIGURE 2 is a section on line II—II of FIGURE 1.

Referring to FIGURES 1 and 2, a magnetic device consists of a thin film 10 of ferromagnetic material of the order of 500 to 1500 A. thick deposited on a substrate 11, preferably of aluminium. The film has mutually perpendicular easy and hard axis of magnetisation the easy axis direction being indicated by the arrow 12, and the film switches, by domain rotation, from one stable state in which the magnetic vector lies in one direction along the easy axis to the other stable state in which the vector lies in the other direction along the easy axis. Strip drive conductors 13, 14, 15, 16, extend parallel to one another and parallel to the plane of the film at a small angle, for example 3 degrees, to the easy axis direction. The drive conductors are arranged in pairs, the conductor 13 being superimposed on conductor 14 and conductor 15 being superimposed on conductor 16. A sense conductor 17 extends at right angles to the drive conductors and the areas of film which are magnetically linked to the conductors at the crossover of sense conductor 17 with conductors 13, 14, 15 and 16 form switching areas indicated diagrammatically at 18 and 19. A write conductor 20 extends parallel to sense conductor 17 and is in superimposed relation therewith. The conductors are insulated from one another and from the film 10 by means of layers of insulating material which for clarity in the drawings are not illustrated.

Figure 3:
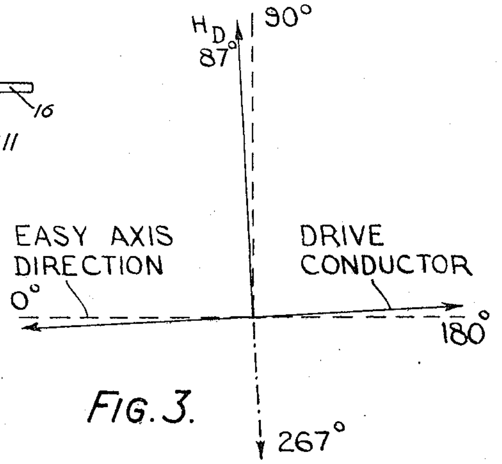
FIGURE 3 is a magnetic vector diagram.

Application of drive current to one or both of the drive conductors 13 and 14 by means of pulse generators 21, 22 respectively produces a magnetic field $H_D$ at an angle slightly less than 90°, in this example 87°, to the easy direction as shown in FIGURE 3.

If the total drive current applied to conductors 13 and 14 is of sufficient magnitude, hereinafter referred to as saturation value, the magnetic vector of area 18 is rotated from its initial stable state, in which it is aligned in the easy direction, substantially into alignment wth the applied field $H_D$. On termination of the drive current the vector relaxes into the 0° direction. However, if a write current of suitable polarity is applied to the conductor 20 by pulse generator 23 to produce a field in the 177° direction concurrently with termination of the drive current in conductors 13 and 14, the vector is caused to relax into the 180° direction. Thus the vector of the area may be caused to relax into either 0° or 180° directions as desired and these two stable states may represent the binary values 0 and 1 respectively. The conductor 17 may serve not only as a sense conductor but additionally as a write conductor in which case conductor 20 is not provided and the write current is applied to conductor 17. Alternatively the vector may be caused to relax into the desired direction in dependence on the polarity of the drive current in conductors 13 and 14 without applying a current to conductor 17. Application of drive current of one polarity rotates the vector to 87° and on termination of the current the vector relaxes to 0° direction. Application of drive current of opposite polarity rotates the vector in the reverse sense into the opposite direction (i.e. 267°) and therefore on termination of the drive current the vector relaxes into 180° direction.

Drive current of less than saturation value causes the vector to rotate to a direction intermediate its initial direction and the direction of the applied field. The extent of rotation of the vector is dependent on the magnitude of the applied field and the vector relaxes into its initial direction on termination of the applied field.

Rotation of the vector induces a voltage pulse in sense conductor 17, the polarity of the pulse being dependent on the direction of rotation of the vector.

With the vector initially in the 180° direction and drive field $H_D$ in the 87° direction two pulses are generated which are either of the same or opposite polarity dependent on whether the current is of saturation or less than saturation value respectively. However, with the vector initially in the 0° direction two pulses of opposite polarity, coincident with the application and termination respectively, of the drive current, are generated irrespective of the value of drive current.

Similarly the vector of area 19 may be rotated to induce signals in sense conductors 17 by the application of current to drive conductors 15, 16 by pulse generators 24, 25 respectively and the vector may be caused to relax into the 180° direction by the additional application of current to write conductor 20.

Figure 4:
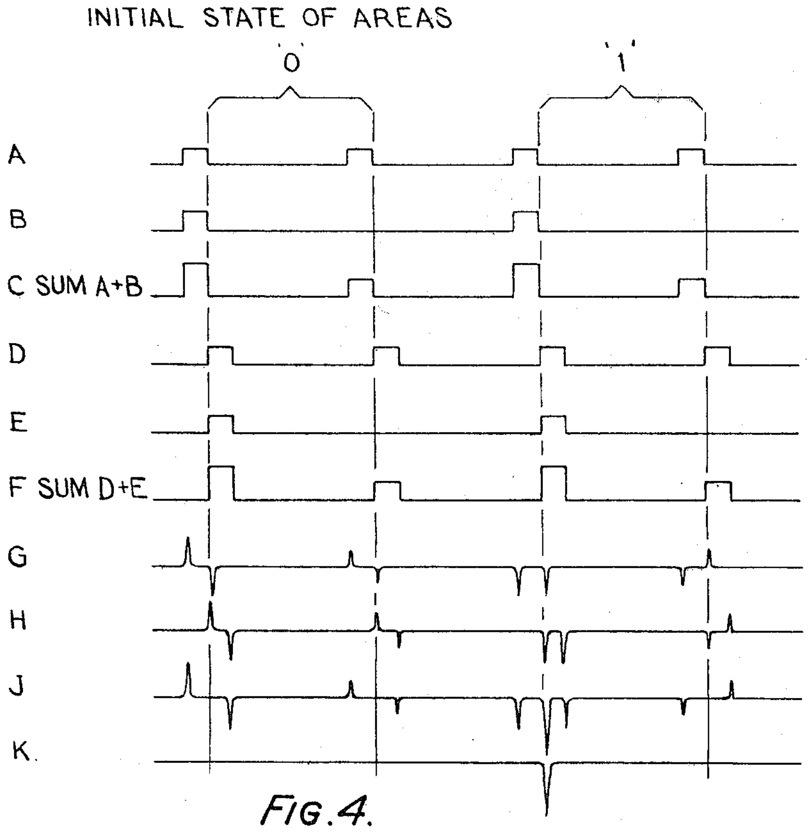
FIGURE 4 shows driving and output waveforms of the device.

In the preferred manner of operation the drive conductors 13, 14 are energised by a current of value, less than saturation value, such that the vector is rotated substantially to the 87° direction or to an intermediate direction according as both or one of the drive conductors are energised. Reference to FIGURE 4 shows the pulses induced in the sense conductor 17 (line G) due to energisation of conductor 13 (line A) with and without concurrent energisation of conductor 14 (line B) when the area 18 is initially in the "0" state and in the "1" state.

The pulses induced in conductor 17 due to energisation of conductor 15 (line D) with or without concurrent energisation of conductor 16 (line E) are shown in line H both for the area 19 initially in the "0" state and in the "1" state.

Drive current is applied to conductors 15 and 16 in coincidence with termination of the drive current in conductors 13 and 14. A convenient method of generating the delayed pulses applied to conductor 15 is to differentiate the pulses from generator 21 and utilise the inverted differential of the trailing edge as the delay pulse. The delayed drive pulses for conductor 16 may be obtained in a similar manner from pulse generator 22. The rotation characteristic of the areas of films 18 and 19 and the coincident edges of the drive current pulses are such that the coincident pulses induced by each area in the sense conductor are of substantially the same shape and amplitude. The resultant output voltage waveform in conductor 17 is shown in line J of FIGURE 3. It will be seen that at the time of coincidence of the trailing and leading edges of the drive pulses, the pulses due to each area 18, 19 are of equal and opposite polarity and therefore cancel except when the areas are initially in the binary "1" state and all the drive conductors are energised. A gate 26 connected in the sense conductor circuit is opened for a period during which only the coincident trailing and leading edges of the drive pulses occur, and thus the signals occurring earlier and later are suppressed leaving the required output signal.

The above described device may be utilised for performing logical operations on items of data represented by the drive current pulses. For example, if the areas are initially set to the "1" state a logical AND operation may be effected by applying one data input to conductors 13 and 15 and a second input to conductors 14 and 16, an output signal being produced only when both inputs are energised.

Other modes of operation are also possible. For example, the pulses due to each area 18, 19 may be combined in reverse phase whereby the output signal is zero only if all the drive conductors are energised and the areas are initially in the "1" state. This may be accomplished either by reversing the direction of the sense conductor of the area 18 relative to the area 19 or by reversing the polarity of the drive current in one pair of drive conductors, say 15 and 16.

A matrix of such devices for storing items of data is readily formed. One drive conductor of each area is connected to one of a number of column wires and the other drive conductor of each area is connected to one of a number of row wires. In addition the devices may be utilised in a three-dimensional matrix of which one plate is shown in FIGURE 5. Using the same references as in FIGURE 1, a separate pair of conductors 13 and 14 is connected to all devices on each of the plates respectively and these pairs of conductors are utilised as plate selectors. Separate pairs of conductors 15, 16 are coupled to each row of devices on the plate and also are coupled to corresponding rows of devices of all the remaining plates to permit row selection. Sense conductors 17 are coupled in common to devices in like columns on all plates and are connected to output gating circuits 27, 28, 29, 30. The drive conductors are arranged in superimposed relation in pairs as in FIGURE 1 but for clarity in FIGURE 5 they are shown side by side.

The conductors 13 are selectively energised by separate pulse generators 31 which also drive corresponding pulse generators 32 to energise conductors 15. The row conductors are energised selectively in a similar manner by pulse generators 33, 34; 35, 36; 37, 38. Separate generators may be used as shown or a pair of generators 31, 33 and delayed pulse generators 32, 34 may be switched to energise selected plate conductors 13, 15 and selected row conductors 14, 16.

In order to achieve the greatest degree of balance of unwanted signals, the areas 18 and 19 of each device should be located as close as possible to one another so that the sense conductor lying between the areas is as short as possible. In this way difference in timing between the pulses due to each area of a device is reduced to a minimum and effects due to non-uniformity of the film as a whole are reduced.

If desired where unidirectional drive currents are utilised a continuous bias field may be applied in the opposite direction thereto in order to improve the permissible tolerance on the value of the half current.

I claim:

1. A magnetic device, including a storage element comprising first and second like areas of ferromagnetic thin film each having an easy axis of magnetization and each being switchable between first and second opposite stable states of magnetization along said easy axis, said element having a first stable condition in which both said areas are in said first stable state and a second stable condition in which both said areas are in said second stable state; a sense conductor magnetically coupled to both said areas; first and second drive means coupled to said first and second areas, respectively, for applying to said areas magnetic fields substantially perpendicular to said sense conductor; first and second current pulse generating means operative to energise said first and second drive means, respectively, to drive said areas towards the same magnetic state, said second generating means being operative in coincidence with termination of operation of said first generating means; and means responsive to signals induced in said sense conductor at said termination to produce a predetermined output signal only when both said areas are driven from said first stable state.

2. A device as claimed in claim 1, in which the coupling between said sense conductor and said areas is such that the signals induced in said sense conductor at said termination substantially cancel each other only when said element is driven from said first stable condition.

3. A device as claimed in claim 1, in which the coupling between said sense conductor and said areas is such that the signals induced in said sense conductor at said termination add together only when said element is driven from said first stable condition.

4. A device as claimed in claim 1, in which said first and second drive means include drive conductors extending closely adjacent the areas at a small angle to said easy axis and perpendicular to said sense conductor.

5. A device as claimed in claim 4, in which each drive means includes a pair of drive conductors and each generating means is operable to apply a current pulse to one drive conductor of a pair insufficient to cause switching of the area coupled thereto and operable to apply a current pulse to both drive conductors of said pair sufficient to cause switching of said area.

6. A device as claimed in claim 4, in which said areas are formed from a single film of ferromagnetic material and are defined only by crossing points of said sense conductor and said drive conductors.

7. A device as claimed in claim 1, in which said means to produce an output signal includes a gate connected to said sense conductor, said gate being opened only at the time of said termination.

8. A magnetic storage matrix, including a plurality of groups of storage elements, each element comprising first and second like areas of ferromagnetic film with single domain characteristics and mutually perpendicular easy and hard axes of magnetization, each element being settable to first and second opposite stable magnetic states; a separate sense conductor coupled to both areas of the storage elements of each group, respectively; a plurality of first and second drive conductors, each first area being coupled to one of the first drive conductors, and each second area being coupled to one of the second drive conductors; means operable to energise that first drive conductor which is coupled to a selected element and operable subsequently to de-energise that first conductor and coincidently to energise the second conductor which is coupled to said selected element to drive both areas of said selected element towards a predetermined magnetic state to induce signals in the sense conductor coupled to said selected element, which signals combine to produce a unique output signal condition only if said selected element was in said first stable state.

No references cited.

BERNARD KONICK, *Primary Examiner.*

G. LIEBERSTEIN, *Assistant Examiner.*